United States Patent [19]

Niwa

[11] Patent Number: 4,811,146

[45] Date of Patent: Mar. 7, 1989

[54] COMPOSITE MAGNETIC HEAD

[75] Inventor: Yoshikazu Niwa, Nagaokakyo, Japan

[73] Assignee: Mitsubishi Denki Kabushiki Kaisha, Tokyo, Japan

[21] Appl. No.: 49,211

[22] Filed: May 13, 1987

[30] Foreign Application Priority Data

May 14, 1986 [JP] Japan .................................. 61-112023

[51] Int. Cl.$^4$ .............................................. G11B 5/23
[52] U.S. Cl. ...................................... 360/119; 360/126
[58] Field of Search ................. 360/119, 120, 125, 126

[56] References Cited

U.S. PATENT DOCUMENTS 4,559,572 12/1985 Kamasaka ........................ 360/126 X

FOREIGN PATENT DOCUMENTS 3447700 7/1985 Fed. Rep. of Germany .

Primary Examiner—A. J. Heinz
Attorney, Agent, or Firm—Birch, Stewart, Kolasch & Birch

[57] ABSTRACT

A composite magnetic head for use in recording and/or reproducing information on a magnetic recording medium, comprises a first magnetizable member having a tape abutting face defined therein for sliding engagement with a magnetic recording medium, and a second magnetizable member having a head gap defined therein. The second magnetizable member has a higher saturated magnetic flux density than that of the first magnetizable member and is embedded in the first magnetizable member and positioned so as to traverse the tape abutting face.

6 Claims, 8 Drawing Sheets

COMPOSITE MAGNETIC HEAD

BACKGROUND OF THE INVENTION

1. Field of The Invention

The present invention generally relates to a composite magnetic head for use in recording and/or reproducing information on a magnetic recording medium.

2. Description of the Prior Art

It is well known in the art that a loss of energy occurring in the magnetic head core as a result of generation of an eddy current when an electric current is supplied to a coil in the magnetic head brings about considerable reduction in high frequency characteristic, and this is particularly manifest where the magnetic head includes the head core made of an alloy having a low specific resistance.

By way of example, referring to FIG. 6 of the accompanying drawings, in the case of a thin plate made of an alloy having a specific resistance $\rho$, the loss We resulting from the eddy current per unit volume is expressed by the following equation.

$$We = \pi^2 \cdot h^2 \cdot f^2 \cdot Bm/6\rho$$

wherein h represents the thickness of the thin plate, f represents the frequency of a recording signal to be recorded, and Bm represents the maximum magnetic flux density. This is attributable to the fact that at high frequency a skin effect occurs in the magnetic flux by reason of the eddy current, which skin effect brings about a substantial reduction in magnetic permeability $\bar{\mu}$. In other words, it is well known that the magnetic permeability $\bar{\mu}$ of the alloy core abruptly decreases with an increase of the sound frequency f. As shown in FIG. 7 of the accompanying drawings, the magnetic permeability of the alloy core decreases to a value lower than the value of the ferrite core when the sound frequency attains a value higher than, for example, 10 KHz. (See, "Jiki-heddo to Jiki-kiroku (Magnetic Head and Magnetic Recording)" published Mar. 15, 1983 by Sogo Denshi Publishing Co.)

In view of the foregoing general notion, it is the well established practice to make the magnetic head using the alloy plate as thin as possible. An example of the prior art magnetic heads using the thin alloy plate is illustrated in FIG. 8 of the accompanying drawings. In the manufacture of the prior art magnetic head shown in FIG. 8, a main core 1, made of a thin alloy plate, and an auxiliary core 2, made of ferrite, are prepared independently and then joined together by a glass-bonding material which forms a glass layer 3 acting not only to bond the main alloy core 1 and the auxiliary ferrite core 2 together, but also to reinforce the main alloy core 1. The magnetic head shown therein has a groove 4 defined therein for the passage of transducer coil windings.

Another example of the prior art magnetic head is shown in FIG. 9 of the accompanying drawings, wherein the core 1 is made of Mn-Zn ferrite. However, the prior art magnetic head shown in FIG. 9 has a problem in that the saturation magnetic flux density is low.

In any event, the prior art alloy head shown and described with reference to FIG. 8 requires complicated manufacturing procedures with increased process steps as compared with the manufacture of the ferrite head shown in FIG. 9 wherein the core material has a high specific resistance, thereby posing a productivity problem. More specifically, in the manufacture of the prior art alloy head shown and described with reference to FIG. 8, the productivity is low not only because care is required to keep a relatively high flatness in the interface between the main alloy core 1 and the auxiliary ferrite core 2, to avoid any possibility of the main alloy core 1 being warped during the manufacture thereof, to avoid any possible reduction in bonding strength and to make the resultant alloy head with precision, but also because a number of minute chips are required to be carefully bonded during the manufacture of the alloy head.

SUMMARY OF THE INVENTION

Accordingly, the present invention has been devised with a view to substantially eliminating the above discussed problems inherent in the prior art magnetic heads and has for its essential object to provide an improved composite magnetic head which can exhibit a high saturation magnetic flux density as well as a favorable high frequency characteristic and which has a high productivity.

According to the present invention, the composite magnetic head herein disclosed for the purpose of accomplishing the above described object comprises a first magnetizable member having a tape abutting surface defined therein for sliding engagement with a magnetic recording medium, a second magnetizable member having a head gap defined therein. The second magnetizable member has a higher saturated magnetic flux density than that of the first magnetizable member and is embedded in the first magnetizable member and positioned so as to traverse the tape abutting surface.

Preferably, the first magnetizable member is made of a ferrite core made of ferrite of high magnetic permeability and, therefore, having a relatively high specific resistance, while the second magnetizable member is made of a metallic core prepared from amorphous, sendust or permalloy.

Preferably, the second magnetizable member is of a generally elongated configuration having a width equal to the width of any one of recording tracks on a magnetic recording medium, in which case the head gap is formed at a portion intermediate of the length of the second magnetizable member so as to extend perpendicular to the lengthwise direction of the second magnetizable member.

According to the present invention, since the second magnetizable member is provided on the first magnetizable member at a location adjacent the head gap in the tape abutting surface where magnetic fluxes tend to concentrate, the saturated magnetic density can be increased. Moreover, even though the second magnetizable member has a low specific resistance, and since the second magnetizable member is partially embedded in the first magnetizable member at the specific location, the loss of energy at a high frequency region which would occur as a result of the eddy current can be advantageously minimized with the consequence that any possible reduction in high frequency characteristic of the resultant magnetic head can be substantially avoided.

In addition to the foregoing features, there is an additional feature in that the present invention is effective to permit the magnetic head to be assembled with the use of a manufacturing process similar to, but simplified as compared with, the prior art process because of the unique construction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more clearly understood from the following description of a preferred embodiment, when taken in conjunction with the accompanying drawings. However, the embodiment and the accompanying drawings are given only for the purpose of illustration and explanation, and are not to be taken as being limitative of the present invention in any way whatsoever, whose scope is to be determined solely by the appended claims. In the accompanying drawings, like reference numerals denote like parts in the several views, and:

DETAILED DESCRIPTION OF THE EMBODIMENT

Figure 1:
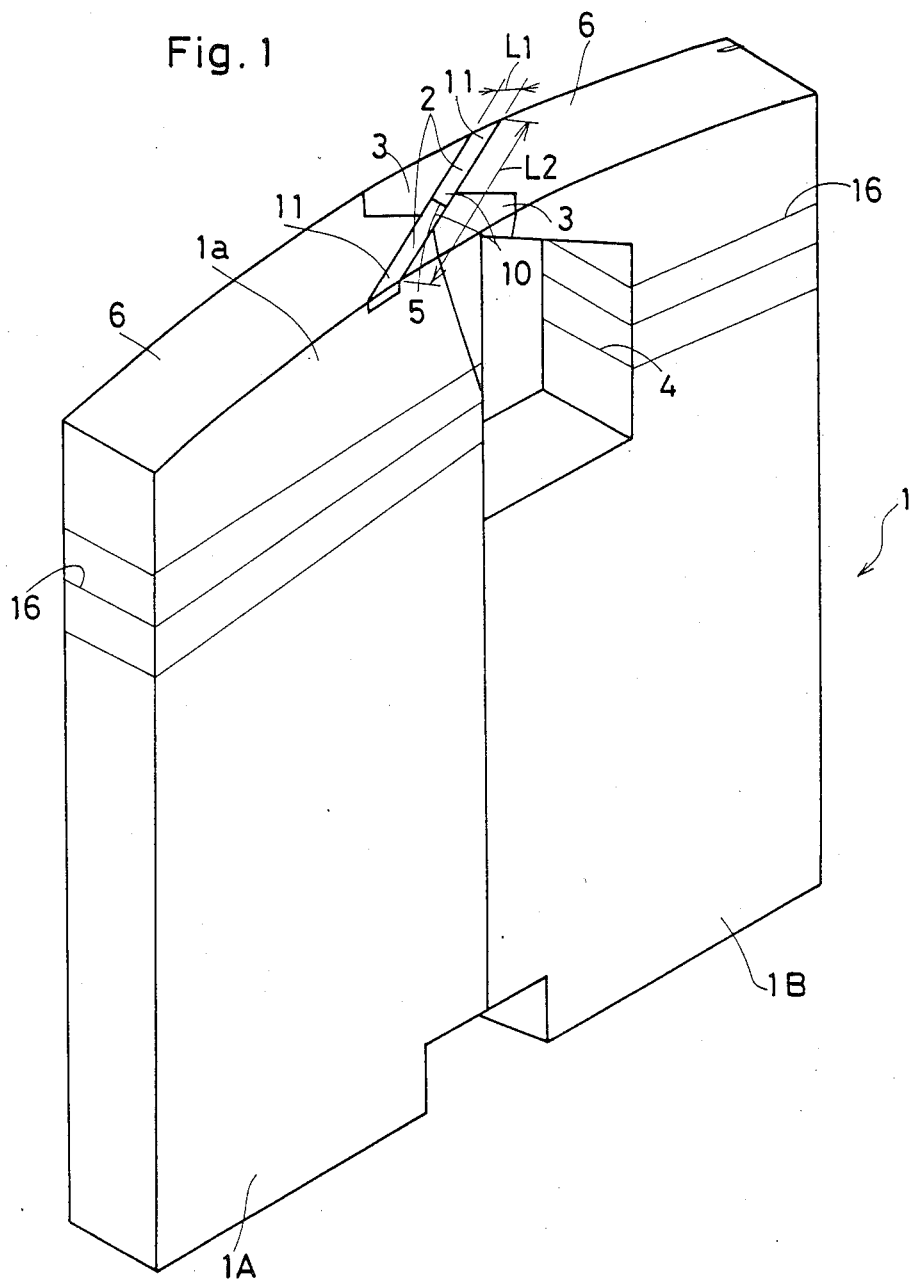
FIG. 1 is a perspective view of a composite magnetic head according to a first preferred embodiment of the present invention.

Referring first to FIG. 1, a composite magnetic head for use in recording and/or reproducing information on a magnetic recording medium according to a first preferred embodiment of the present invention comprises a first magnetizable member or head core 1 having both a high specific resistance and a high magnetic permeability, and a second magnetizable member 2 made of a metal having a higher saturated magnetic flux density than that of the first magnetizable member 1.

The first magnetizable member or head core 1 is made of a ferrite material, for example, Mn-Zn ferrite, and has a head-to-medium contact surface or tape abutting face 6 defined therein for sliding contact with a magnetic recording medium, for example, a length of magnetic recording tape, for recording or reproducing information on the magnetic recording medium. The head core 1 is of two-piece construction including a pair of complementary rectangular poles 1A and 1B abutting at confronting gap faces and joined together by a bonding material, preferably a glass-bonding material, which also forms a non-magnetic glass layer 3. The rectangular pole 1B has a groove 4 defined therein so as to extend inwardly of the gap face thereof to permit winding of a transducer coil 16 to be wound about both of the poles 1A and 1B.

The second magnetizable member 2 made of, for example, amorphous, sendust or permalloy, is also of two-piece construction comprising a pair of metal bands. These metal bands forming the second magnetizable member 2 are embedded in the head core 1 inwardly of the head-to-medium contact surface 6 so that respective surfaces of the metal bands of the second magnetizable member 2, which face in a direction counter to the head core 1, can be situated flush with, and exposed to the outside from, the head-to-medium contact surface 6 while they are lengthwisely aligned at one end 10 with each other with a gap 5 defined therebetween. This second magnetizable member 2 has a width L1 so selected as to be equal to, or substantially equal to, the width of a record track on the magnetic recording medium. The length L2 of the second magnetizable member 2, that is, the total length of the metal bands plus the width of the gap 5 is such that opposed ends 11 of the respective metal bands remote from the gap 5 can terminate flush with the opposite planar major surfaces 1a of the head core 1 while the second magnetizable member 2 extends diagonally with respect to the lengthwise direction of the head-to-medium contact surface 6 with the respective ends 10 confronting with each other. The angle of a gap face (respective surfaces of the rectangular poles 1A and 1B confronting with each other and situated on respective sides of the gap 5) relative to the longitudinal direction of the second magnetizable member 2 is selected to be 90°.

It is to be noted that, in view of the second magnetizable member 2 extending slantwise relative to the longitudinal direction of the head-to-medium contact surface 6, such opposed ends 11 of the respective metal bands remote from the gap 5 are so machined and so shaped as to be slantwise relative to the lengthwise direction of the second magnetizable member 2 and in flush with the associated planar major surfaces 1a of the head core 1.

In the construction as hereinabove described, since the second magnetizable member is made of a metallic material having a high saturated magnetic flux density than that of the first magnetizable member, that is, the head core 1, the composite magnetic head having a high saturated magnetic flux density can be obtained.

In addition, since the second magnetizable member 2 has a width equal to or substantially equal to the record track width of the magnetic recording medium, the loss We resulting from the eddy current as hereinbefore discussed can be advantageously minimized even though the second magnetizable member 2 has a relatively low specific resistance $\rho$ and, accordingly, the composite magnetic head according to the present invention can exhibit an improved high frequency characteristic.

The feature that the opposite ends 11 of the second magnetizable member 2 remote from the gap 5 are slanted to permit them to be flush with the respective planar major surfaces 1a of the head core 1 does not make the joint face between the head core 1 and the second magnetizable member 2 parallel to the gap 5 and, therefore, no so-called quasi-gap will be formed. Accordingly, with the composite magnetic head according to the present invention, there is no possibility that unnecessary recording which would occur as a result of the leakage of magnetic fluxes from the quasi-gap would be rendered on the magnetic recording medium.

The method of making the composite magnetic head of the construction shown and described with reference to FIG. 1 will now be described with particular reference to FIGS. 2(a) to 2(i).

Figure 2:
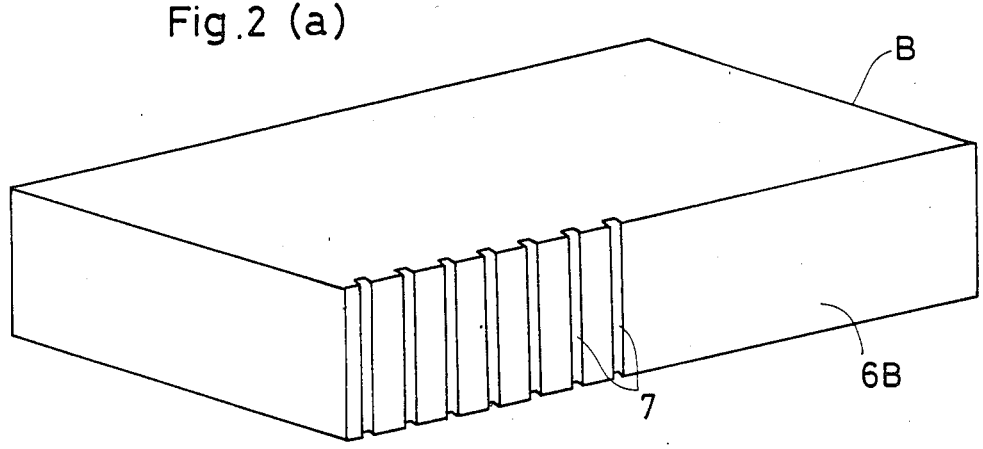
FIGS. 2(a) to 2(i) are schematic diagrams showing the sequence of manufacture of the composite magnetic head shown in FIG. 1.
Figure 2:
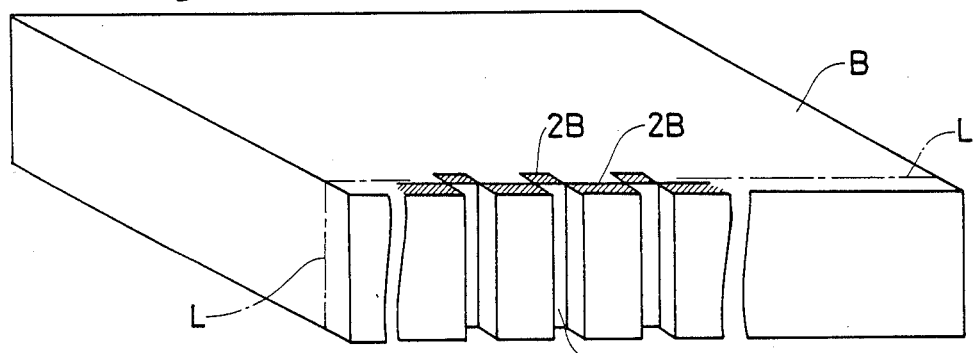
Figure 2:
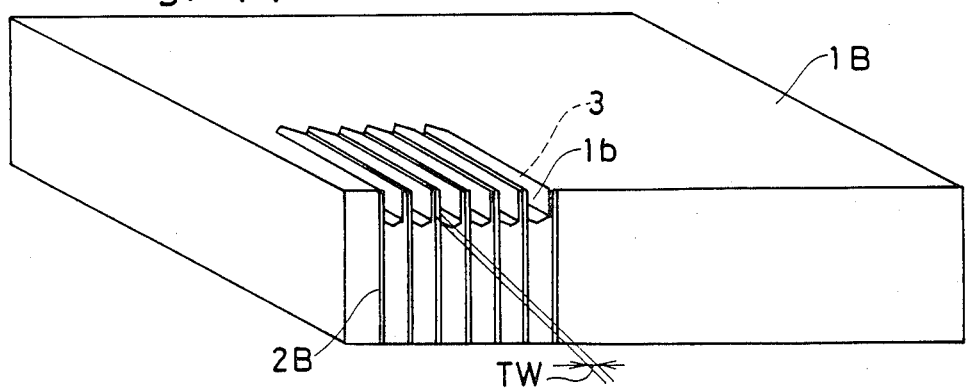
Figure 2:
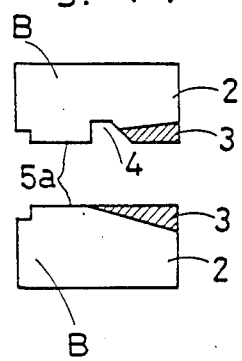
Figure 2:
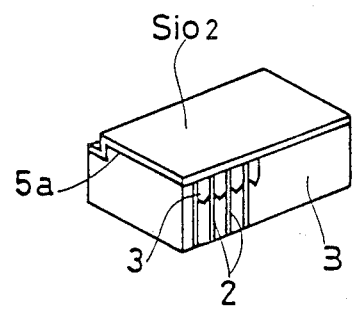
Figure 2:
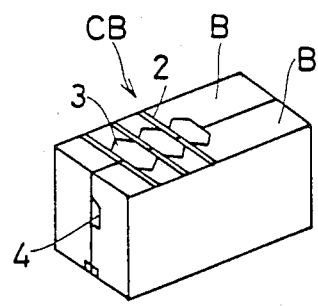
Figure 2:
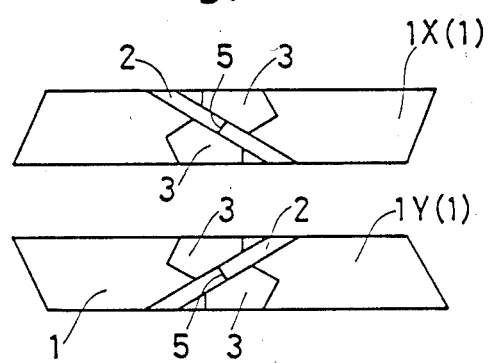
Figure 2:
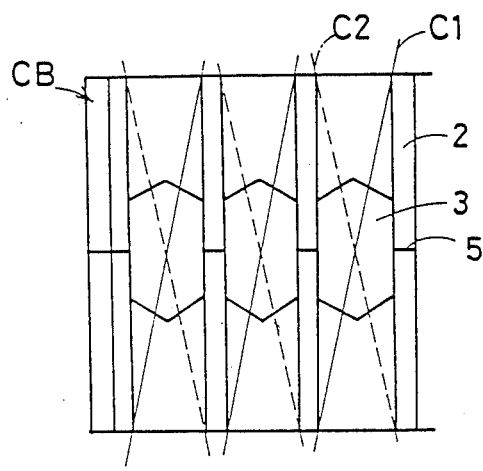
Figure 2:
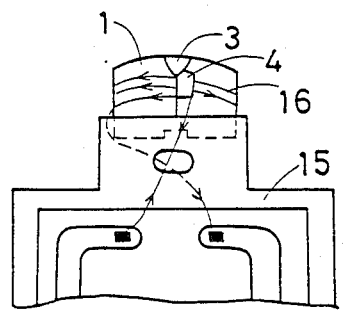

FIG. 2(a) illustrates a rectangular block B of a material for the head core 1, for example, Mn-Zn ferrite, having one side face 6B formed with a plurality of equally spaced grooves 7 each recessed inwardly thereof and extending completely across the thickness of the rectangular block B. The rectangular block B would eventually produce a number of either the rectangular poles 1A or the rectangular pole 1B, and therefore, the side face 6B where the equally spaced grooves 7 are formed corresponds in position to the respective head-to-medium contact surfaces 6 of the rectangular poles 1A or 1B.

After the formation of the equally spaced grooves 7, and a shown in FIG. 2(b), a metallic material for the second magnetizable members 2 is embedded in all of the grooves 7 inwardly of the side face 6B as shown by 2B by the use of, for example, any known sputtering technique, and subsequently, serrations which are left by the formation of the grooves 7 are removed by cutting along a cutting line L thereby to permit the embedded metallic material to be exposed in the form of parallel metal bars flush with the cut side face of the block B, which parallel bars correspond to the respective second magnetizable member 2.

Process steps to be performed subsequent to the process step shown in FIG. 2(b) may be substantially identical with those in the method employed to make the prior art ferrite magnetic head. Specifically, as shown in FIG. 2(c), one of the opposite major surfaces of the block B having the metal bars exposed to the outside as shown in and described with reference to FIG. 2(b) is inwardly grooved in such a way as to remove portions of the ferrite material, each delimited between the neighboring second magnetizable member 2, thereby leaving a generally elongated, respective recess 1b therebetween and, at the same time, defining portions of the respective second magnetizable members 2 which have a width equal to the record track width Tw. Thereafter, the elongated recesses 1b are filled or molded with a glass-bonding material 3, followed by grinding of the block B to provide a transversely extending recess which would eventually become coil winding grooves 4 in the respective rectangular poles 1B (FIG. 2(d)). It is to be noted that the block for the rectangular poles 1A need not be formed with such a transversely extending recess since, in the instance as shown in FIG. 1, the coil winding groove 4 is formed only in the rectangular pole 1B. After the molding of the glass-bonding material, a surface 5a of the block, which corresponds in position to the gap faces, is finely ground.

Then, as shown in FIG. 2(e), a layer of non-magnetizable material, for example, silicon dioxide, which would eventually form a gap layer sandwiched between the metal bands of the second magnetizable member 2, is vapor-deposited on the surface 5a of the block B.

Thereafter, as shown in FIG. 2(f), two blocks B are joined together by fusing and solidifying the glass-bonding material 3 to provide a composite body identified by CB. After the formation of the composite body CB, and as shown in FIG. 2(g), the composite block CB is cut along a plurality of cutting lines C1 or C2 each extending at an azimuth angle thereby to form the head core 1. Each of the head cores 1 so formed, when viewed in a direction towards the respective head-to-medium contact surface, represents such a shape as shown by 1X(1) in FIG. 2(h) when the composite block CB is cut along the lines C1, but represents such a shape as shown by 1Y(1) in FIG. 2(h) when the composite block CB is cut along the lines C2.

After the head-to-medium contact surface of each of the head cores 1 shown in FIG. 2(h) has been polished, it is, as shown in FIG. 2(i), mounted on a carrier plate 15, which may be an electrode substrate, and is wound with the transducer coil 6.

The composite magnetic head manufactured in the manner as hereinbefore described with reference to FIGS. 2(a) to 2(i) is of a structure which can be fabricated with the use of any known method for making the prior art ferrite magnetic head exhibiting a high productivity, in which known method a plurality of ferrite head cores can be formed from a single ferrite block, and can realize an azimuth recording, as easily as with the prior art ferrite magnetic head, which is largely practiced with the prior art ferrite magnetic head in order to accomplish a high density magnetic recording. Moreover, the positioning of the magnetizable member 2, made of the metal having a high saturated magnetic flux density, at a location adjacent the gap 5 where magnetic fluxes induced in the head core having its matrix made of ferrite tend to concentrate can be achieved during the execution of the prior art head making method, and, therefore, the composite magnetic head having a high performance and a good productivity can be obtained.

Figure 3:
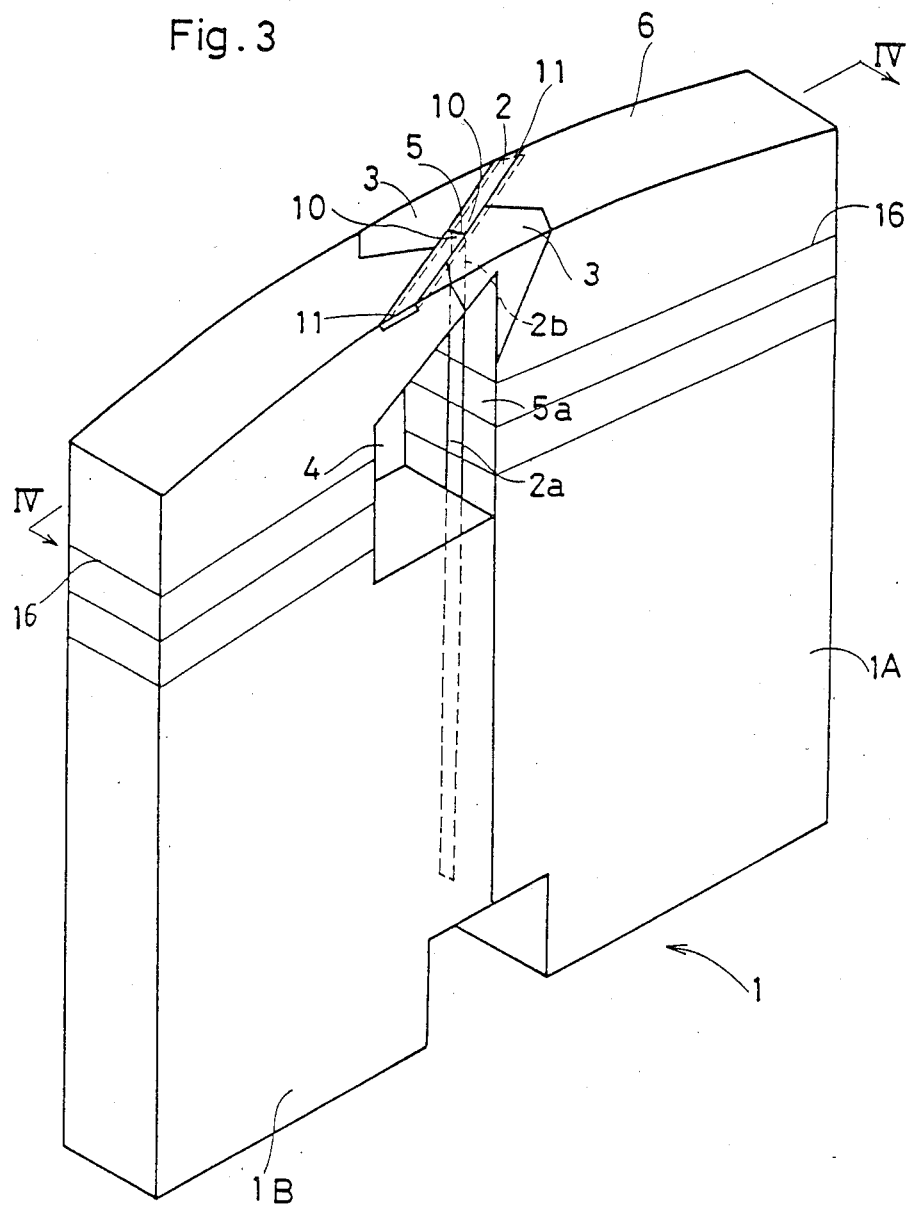
FIG. 3 is a perspective view of the composite magnetic head according to a second preferred embodiment of the present invention.
Figure 4:
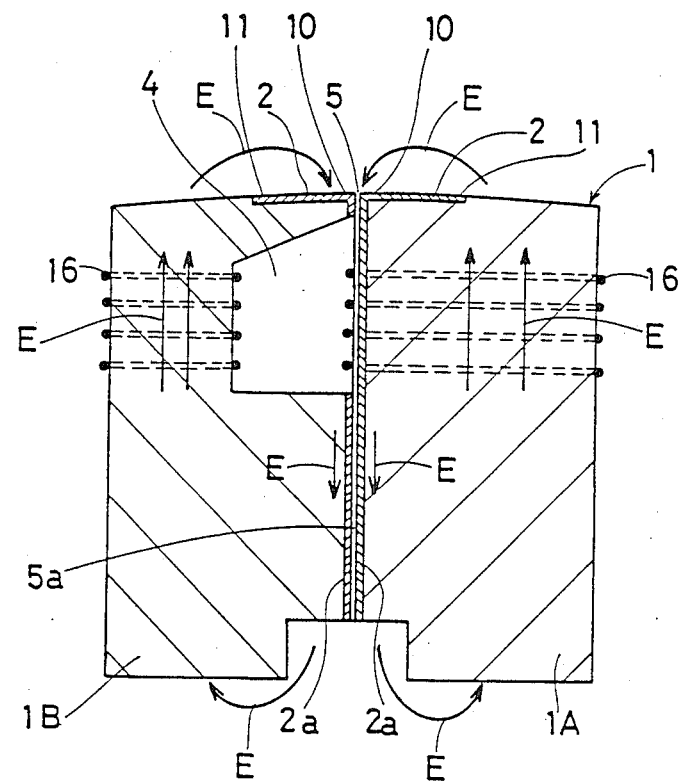
FIG. 4 is a cross-sectional view, on a somewhat reduced scale, taken along the line IV—IV in FIG. 3.

The composite magnetic head according to another preferred embodiment of the present invention is shown in FIGS. 3 and 4. While in the foregoing embodiment each of the metal bands forming the second magnetizable member 2 lies substantially parallel with the head-to-medium contact surface 6, this embodiment shown in FIGS. 3 and 4 is such that each of the metal bands forming the second magnetizable member 2 has an extension 2a extending inwardly of the head core 1 at right angles thereto and along the associated confronting gap face 5a of the respective rectangular pole 1A or 1B. The extension 2a have one end integral with one of the ends 10 of the respective metal band adjacent the gap 5 as best shown in FIG. 4. While the extension 2a extending inwardly of the head core 1 along the gap face 5a of the rectangular pole 1A forming a part of the head core 1 is continuous over the entire length of the gap face 5a of the rectangular pole 1A of the head core 1, the extension 2a extending inwardly of the head core 1 along the gap face 5a of the rectangular pole 1B is comprised of two portions disconnected by the coil winding groove 4.

It is to be noted that one end of each of the extensions 2a described as integral with the end 10 of the associated metal band forming a part of the second magnetizable member 2 should be continued thereto in order to avoid any possible formation of the quasi-gap which would be present if each of the metal bands of the second magnetizable member 2 is discontinued from the associated extension 2a.

According to the embodiment shown in and described with reference to FIGS. 3 and 4, a substantial amount of the magnetic fluxes E developed by the flow of an electric current through the transducer coil windings 16 can extend through the extensions 2a where the saturated magnetic flux density is high. Consequently, the loss We resulting from the occurrence of the eddy current can be advantageously reduced.

Figure 5:
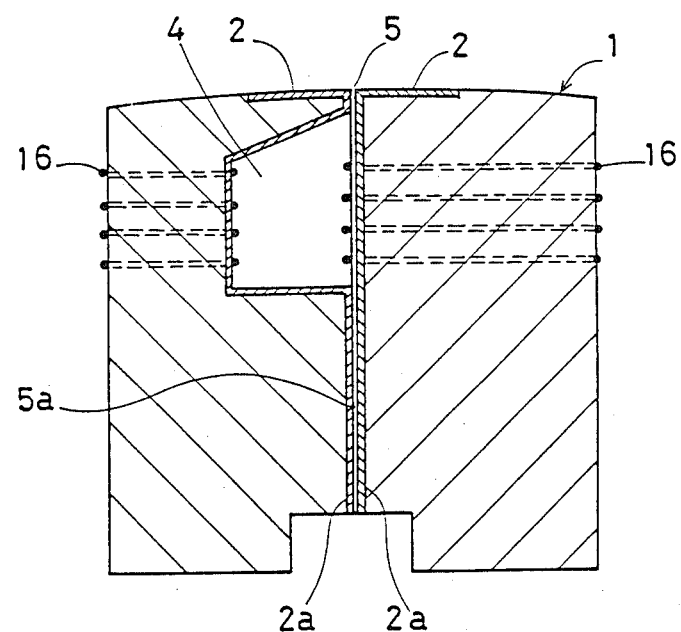
FIG. 5 is a view similar to FIG. 4, showing the composite magnetic head according to a third preferred embodiment of the present invention.
Figure 6:
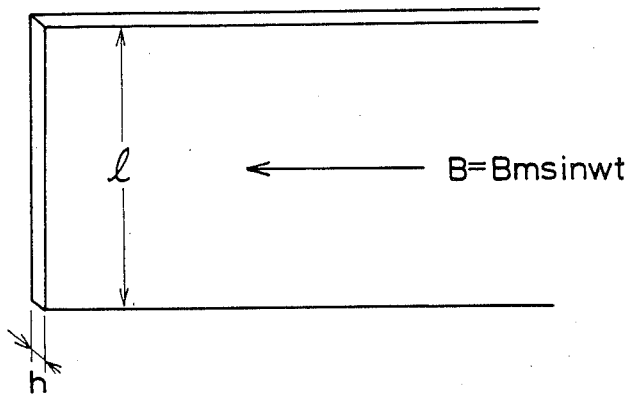
FIG. 6 is a perspective view of a core material used for the purpose of explaining the loss of energy resulting from the generation of any eddy current.
Figure 7:
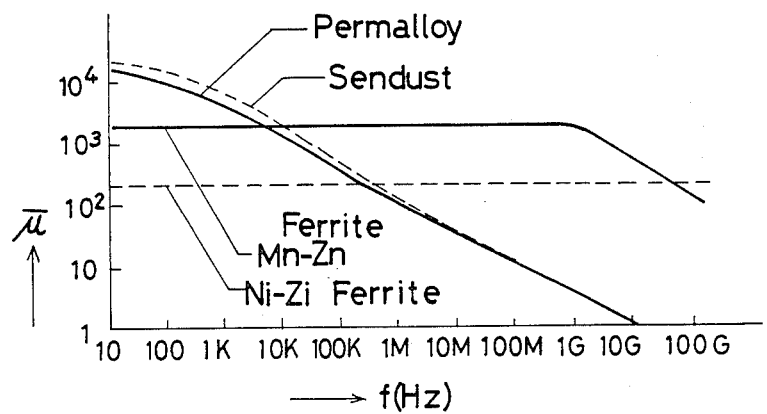
FIG. 7 is a graph showing the relationship between the magnetic permeability and the applied frequency exhibited by core materials used in magnetic heads.
Figure 8:
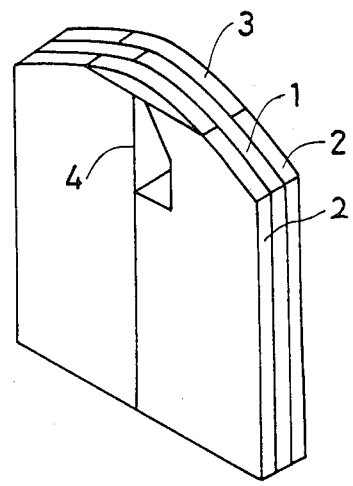
FIGS. 8 and 9 are schematic perspective views showing the two prior art magnetic heads, respectively.
Figure 9:
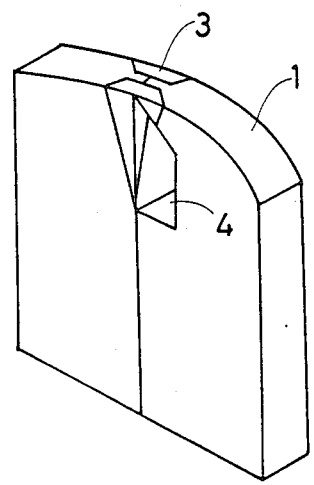

Although the extension 2a extending along the gap face 5a of the rectangular pole 1B has been described as discontinued by the coil winding groove 4, it may be continued over the entire length of the gap face 5a of such rectangular pole 1B as shown in FIG. 5, extending along the upper portion of the gap face 5a, then along a shaped wall defining and confronting the groove 4 and down along the lower portion of the gap face 5a, provided that the high frequency characteristic of the resultant composite magnetic head will not be reduced. The composite magnetic head according to the embodiment shown in FIG. 5 is advantageous in that the loss We resulting from the occurrence of the eddy current can further be reduced.

In either of the embodiments shown in FIGS. 3 and 4 and FIG. 5, each of the extensions 2a can be formed by the use of any suitable sputtering technique during and simultaneously with the formation of the associated metal band of the second magnetizable member 2 which has been described with reference to FIG. 2(b).

From the foregoing description of the present invention, it is clear that a region of the composite magnetic head which is brought into sliding engagement with the magnetic recording medium, for example, the magnetic recording tape is made of the magnetic metal having a high saturated magnetic flux density. Therefore, the composite magnetic head according to the present invention can be advantageously operable with the magnetic recording tape, such as, for example, a metal recording tape, having a high reluctance HC, and can be fabricated with a high productivity while being capable of exhibiting a favorable high frequency characteristic.

Although the present invention has been fully described in connection with the preferred embodiments thereof with reference to the accompanying drawings, it can be varied in numerous ways within the framework of obviousness by those skilled in the art. By way of example, the composite magnetic head herein described according to the present invention has been shown as having a shape suited for use in a video tape recording and/or reproducing apparatus, but the shape thereof may not be always limited to that shown in and described with reference to the accompanying drawings.

Such changes and modifications are, accordingly, to be construed as included within the spirit and scope of the present invention as defined by the appended claims, unless they depart therefrom.

What is claimed is:

1. A composite magnetic head for use in at least one of recording and reproducing information on a magnetic recording medium, said head comprising a first magnetizable member having a tape abutting face defined therein for sliding engagement with the magnetic recording medium, and a second magnetizable member having a head gap defined therein, said second magnetizable member having a higher saturated magnetic flux density than that of the first magnetizable member and being embedded in the first magnetizable member and being positioned to traverse the tape abutting face, said second magnetizable member is of a generally elongated configuration having a width equal to a width of any one of the recording tracks on the magnetic recording medium, and wherein the head gap is formed at a portion intermediate of a length of the second magnetizable member to extend perpendicular to a lengthwise direction of the second magnetizable member, said gap dividing the second magnetizable member into two bands.

2. The composite magnetic head as claimed in claim 1, wherein the second magnetizable member is made of a metallic core.

3. The composite magnetic head as claimed in claim 1, wherein the second magnetizable member extends slantwise relative to the tape abutting face.

4. The composite magnetic head as claimed in claim 3, wherein the second magnetizable member has its opposite ends slanted and in flush with opposite planar major surfaces of the first magnetizable member.

5. The composite magnetic head as claimed in claim 4, wherein the first magnetizable member is comprised of a pair of generally similarly shaped pole pieces having respective gap faces joined together with the gap between the gap faces and wherein said second magnetizable member is of two-piece construction comprised of a pair of bands spaced by the gap, each of said bands having an extension extending along a respective gap face.

6. The composite magnetic head as claimed in claim 1, wherein the first magnetizable member is made of a ferrite core.

* * * * *